(12) United States Patent
Becocci et al.

(10) Patent No.: US 7,114,335 B2
(45) Date of Patent: *Oct. 3, 2006

(54) APPARATUS FOR CONTROLLING A HYDRAULIC CIRCUIT FOR CLUTCHES

(75) Inventors: Andrea Becocci, Prato (IT); Laghi Samuele, Vernio Prato (IT)

(73) Assignee: Formula, S.R.L., (IT)

( * ) Notice: Subject to any disclaimer, the term of this patent is extended or adjusted under 35 U.S.C. 154(b) by 44 days.

This patent is subject to a terminal disclaimer.

(21) Appl. No.: 10/968,769

(22) Filed: Oct. 19, 2004

(65) Prior Publication Data

US 2005/0115238 A1   Jun. 2, 2005

(30) Foreign Application Priority Data

Oct. 21, 2003 (IT) .............................. FI2003A0265

(51) Int. Cl.
*F15B 7/08* (2006.01)
*F01B 31/14* (2006.01)

(52) U.S. Cl. ........................................ 60/588; 92/60.5

(58) Field of Classification Search ................... 60/585, 60/588; 92/60.5
See application file for complete search history.

(56) References Cited

U.S. PATENT DOCUMENTS 5,636,518 A * 6/1997 Burgoyne et al. ............. 60/594

| | | | |
|---|---|---|---|
| 6,457,378 B1 * | 10/2002 | Hatakoshi et al. | ............ 74/525 |
| 6,804,961 B1 * | 10/2004 | Lumpkin | ...................... 60/588 |
| 6,957,534 B1 * | 10/2005 | Lumpkin | ...................... 60/588 |
| 2003/0183038 A1 | 10/2003 | Cornolti et al. | |
| 2005/0056110 A1 * | 3/2005 | Laghi et al. | .................. 74/489 |
| 2005/0056508 A1 * | 3/2005 | Laghi | ......................... 188/344 |

FOREIGN PATENT DOCUMENTS

| | | |
|---|---|---|
| EP | 1325863 A1 | 7/2003 |
| EP | 1514757 A1 | 3/2005 |
| EP | 1526066 A2 | 4/2005 |
| GB | 1188893 | 4/1970 |
| IT | 0218037 | 12/1988 |
| JP | 59040021 | 3/1984 |

* cited by examiner

*Primary Examiner*—Edward K. Look
*Assistant Examiner*—Michael Leslie
(74) *Attorney, Agent, or Firm*—McGlew & Tuttle, PC

(57) ABSTRACT

Apparatus for controlling a hydraulic circuit to be used for operating hydraulic clutches with a pump (8) connected with a relevant reservoir (88) for the fluid of the hydraulic circuit and comprising a piston (89) sliding within a relevant chamber (80) provided with one or more ports (83, 84) for connection to said reservoir (88), the said piston being so shaped as to close/open the said ports (83, 84) upon its stroke along said chamber (80), apparatus being characterized in that the idle stroke of the piston (89) within said chamber (80) is adjustable through a rotation of the same piston (89) about its longitudinal axis.

20 Claims, 3 Drawing Sheets

APPARATUS FOR CONTROLLING A HYDRAULIC CIRCUIT FOR CLUTCHES

The present invention relates to an apparatus for controlling a hydraulic circuit for a clutch of motor vehicles, especially of motorcycles and the like.

BACKGROUND OF THE INVENTION

It is known that the action to be exerted on the pack of the clutch diks is made easier by means of a hydraulic circuit which comprises a pump and a piston acting on the disks' pack. In the motorcycles, for example, a lever is provided for operating said pump whose activation determines the displacement of the piston.

In the motorcycles provided with a traditional apparatus of this type, a drawback is due to the relative difficulty of adjusting the idle stroke of the control lever. In fact, in the existing devices, the lever is connected to a piston sliding into a respective chamber exhibited by the pump and, in order to adjust the idle stroke of the lever it is currently necessary to move axially the piston with respect to the chamber inside which it slides. This approach is however very complex structurally, and affects negatively the constructional simplicity of the device and its robustness upon use, besides raising the relevant production cost thereof.

SUMMARY OF INVENTION

The main object of the present invention is to provide an easily adjustable apparatus for controlling hydraulic circuits.

This result has been achieved, according to the invention, by adopting the idea of making an apparatus having the characteristics disclosed in the claim 1.

Further characteristics being set forth in the dependent claims.

Among the advantages of the present invention there is the fact that it is possible to adjust the idle stroke for the operation of the clutch's hydraulic circuit with greatest ease; that the controlled circuit maintains its original characteristics; that no protruding parts are provided likely to be damaged or be a danger for the driver of the vehicle being equipped with the apparatus; that the apparatus has extremely limited overall dimensions and, therefore, gives the handlebar a greater compactness; that a more attractive appearance is conferred to the handlebar; that the apparatus keeps its characteristics unchanged also after a prolonged service life.

BRIEF DESCRIPTION OF THE DRAWINGS

These and other advantages and characteristics of the invention will be best understood by anyone skilled in the art from a reading of the following description in conjunction with the attached drawings given as a practical exemplification of the invention, but not to be considered in a limitative sense, wherein.

DETAILED DESCRIPTION OF THE INVENTION

Figure 1:
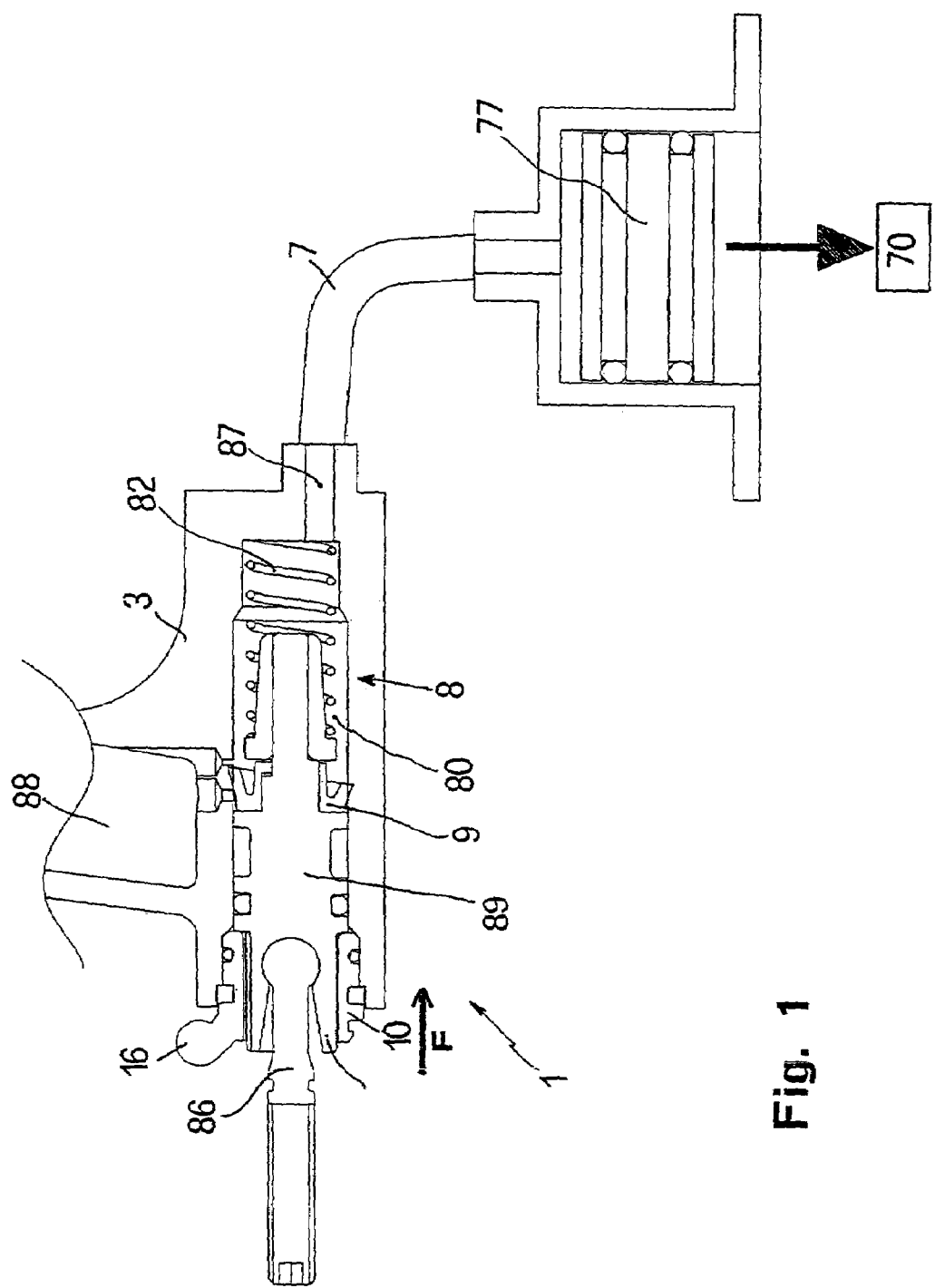
FIG. 1 shows a view in longitudinal section of a possible exemplary embodiment of an apparatus for controlling hydraulic circuits according to the invention, in association with a portion of the handlebar.

With reference to the example shown in the attached figures, an apparatus 1 according to the present invention can be associated with a portion of a motorcycle or the like, such as a handlebar, for example, by means of suitable fixing means (not shown). The present apparatus comprises a body 3 (shown only partially) inside which a cavity 88 is formed defining the reservoir for the fluid of the hydraulic circuit. The said reservoir 88 results positioned between the handlebar, to which the body 3 is fixed, and a lever for operating the pump acting on the hydraulic circuit of the clutch. The clutch-operating lever (not shown) results linked with a connecting rod 86 having spherical head, as represented on the left side of the attached figures.

Shown in FIG. 1 is a conduit 7 making part of the hydraulic circuit and connecting the apparatus 1 to the piston 77 which acts upon the clutch disks, the latter being schematically represented by the block 70 in FIG. 1.

The conduit 7 is connected downstream of a pump 8 in correspondence of an outlet port 87 through which the fluid of the hydraulic circuit is pushed when acting on the clutch's control. The pump 8 is defined by a chamber 80 included in the body 3 and inside which a piston 89 slides. The piston 89 is connected to the control lever via the connecting rod 86 which is disposed, relative to the piston, on the side opposite to the position of port 87 in the chamber 80. The actuation of the control lever is cause for the displacement of the piston 89 (from left to right when referring to arrow F of FIG. 1) towards the port 87. The return of piston 89 to its rest position is determined by a spring 82 whose reaction is in a direction opposite to that indicated by arrow F in FIG. 1.

Figure 2:
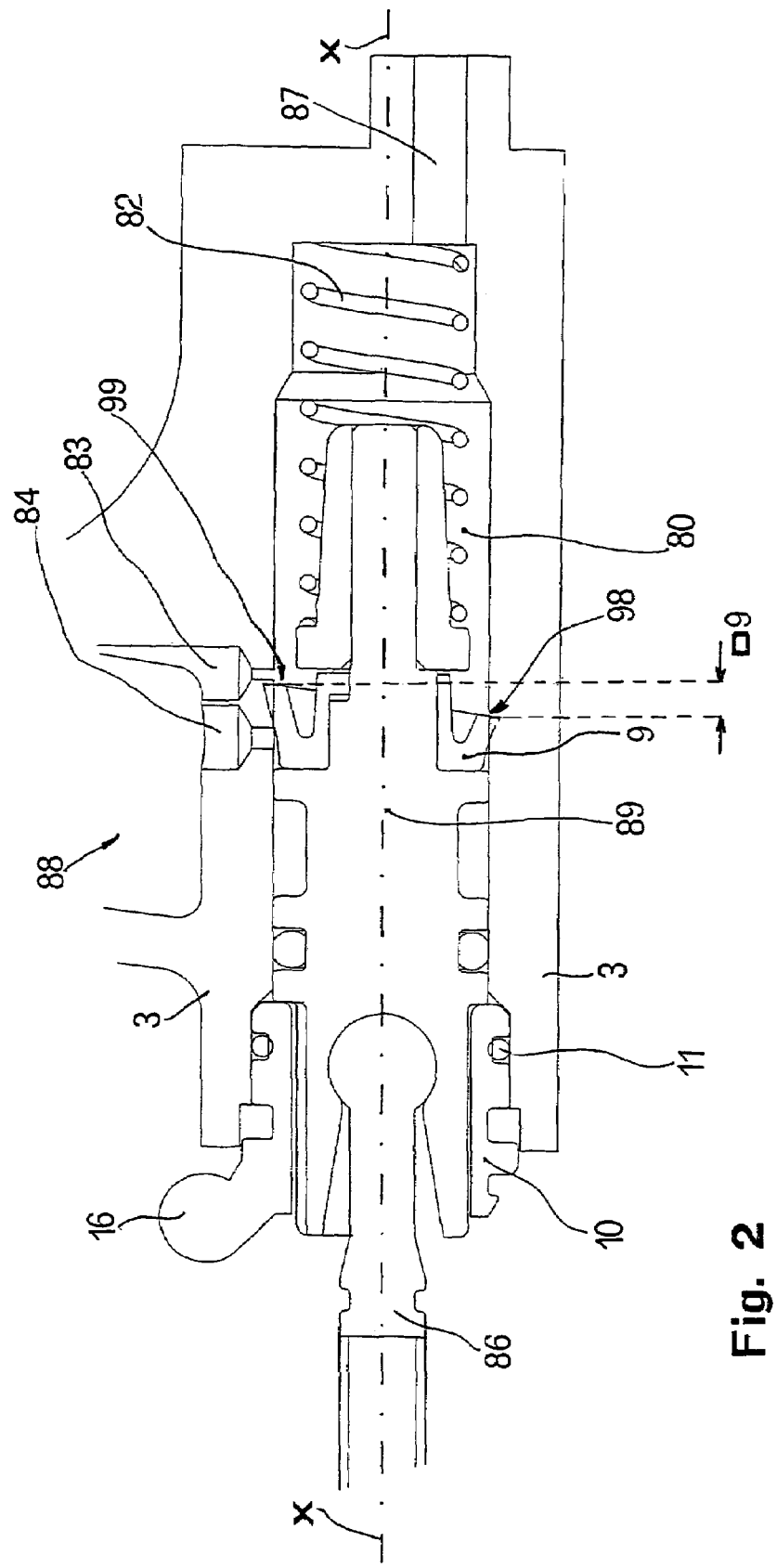
FIG. 2 is an enlarged detail of the embodiment of FIG. 1, in which some lines in the drawing have been omitted for the sake of simplicity.

As best shown in FIG. 2, keeping the piston 89 within the chamber 80 is ensured by the presence of a bush 10 provided with a relevant gasket 11.

The bush 10 is solid to the piston 89 and, for this reason, the piston 89 can rotate together with the bush 10 relative to chamber 80. Solid to the bush 10, that is, made as one body therewith, is a knob 16 disposed radially with respect to the longitudinal development of the chamber 80, that is, substantially orthogonal to the longitudinal axis X—X of the chamber 80. The rotation of the knob 16 determines a corresponding rotation of the piston 89 within the chamber 80.

The chamber 80 is connected with a reservoir 88 via two ports 83 and 84 which are disposed in a region acted upon by the piston's slide. In a manner known per se, the fluid is made to pass bidirectionally through the ports 83 and 84 between the reservoir and the chamber 80 during the axial displacement of the piston 89, that is, during the actuation of the pump 8.

Fitted on the piston 89 is a gasket 9 having circumferential development. The gasket 9, along its circumferential profile, exhibits a different extension in axial direction. In practice, the gasket 9 has a longitudinal development with a height varying therealong. Indicated by D9 in FIG. 2 is the difference between the height of the overlying edge 99 and the corresponding extent of the underlying edge 98. In other words, the plane of said edges 98, 99 forms an acute angle, that is, an angle lower than 90°, with the said axis X—X.

This particular shape of gasket 9 is cause for a different interaction of the piston 89 with respect to the ports 83 and 84 of reservoir 88. In other words, the interaction front of the gasket 9 with the ports 83 and 84 is displaced in the axial direction; in practice, by rotating in one direction or the other the piston 89 (which can be obtained by means of knob 16), the gasket 9 closes in advance or with delay the port 83, that is, before or after the intervention on the clutch. There is thus obtained an adjustment of the idle stroke of the relevant lever through an extremely simple and effective solution.

Figure 3:
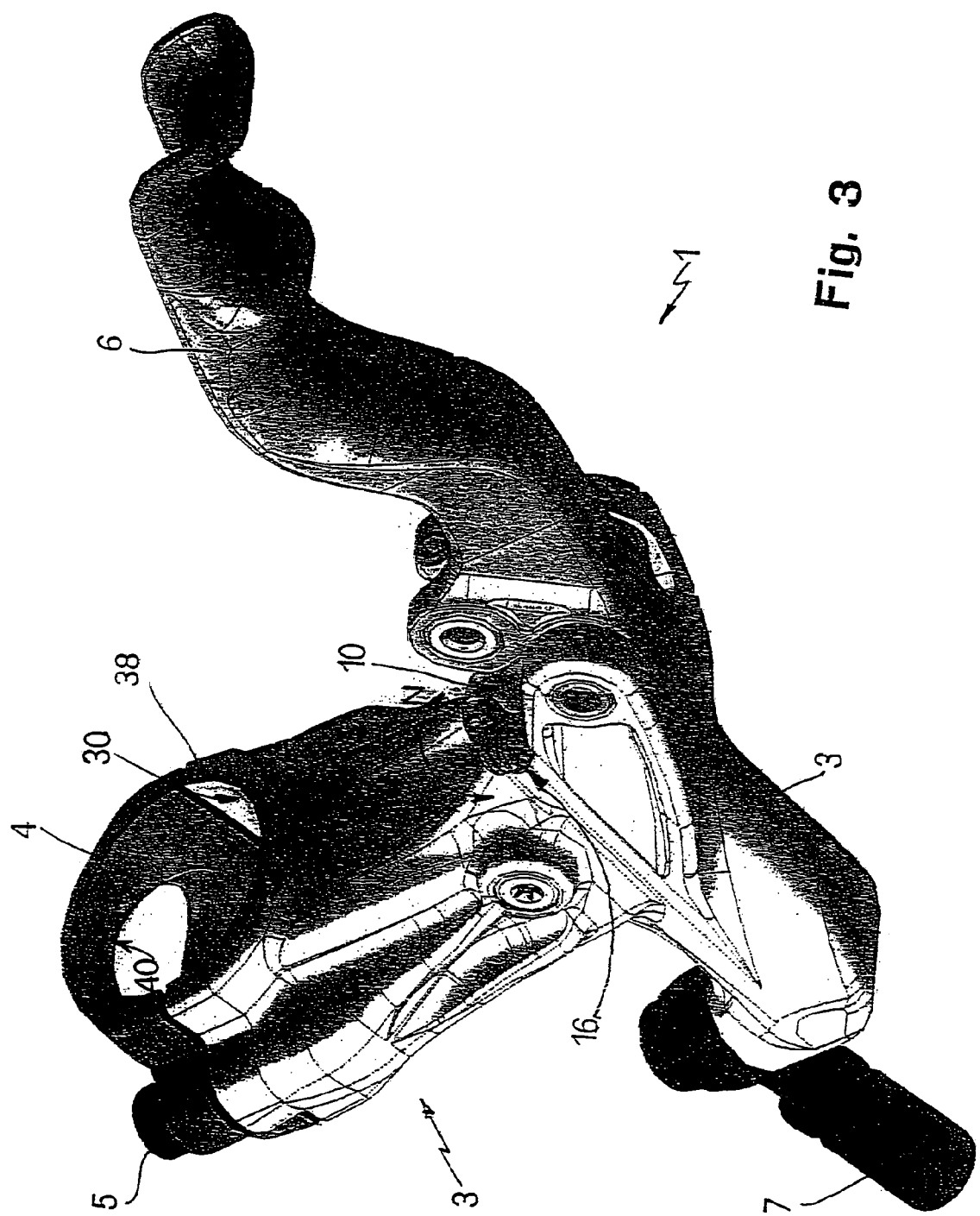
FIG. 3 is a perspective view from below of the apparatus of FIG. 1.

Advantageously, moreover, the reservoir 88 is defined by a corresponding cavity formed in the body 3 of the apparatus 1. In particular, reference being made to FIG. 3, the body 3 of the apparatus 1 has a concave, substantially semicylindrical surface 30 and is so shaped as to be complementary with the profile of a tubular element of the handlebar. The reservoir 88 is closed on top by a lid 38. The lid is provided with screws 5 going therethrough to fix the apparatus 1 to the handlebar 2. Moreover, the lid 38 is of concave shape so that it can fit complementarily with the profile of the handlebar tube 2. This characteristic allows the reservoir 88 to be seated stably in a region protected against bumps and tampering with.

On the body 3, on either side of said surface 30, there are provided seats 39 for receiving corresponding screws 5 allowing the attachment of the apparatus 1 to the handlebar. The apparatus 1 also comprises a semicollar 4 having a concavity 40 of substantially semicylindrical shape so as to fit complementarily with the handlebar. Provided on the semicollar 4 are through holes to receive the said screws 5.

This undoubtly provides a further advantage in terms of safety inasmuch as no protruding parts are present that could be damaged or cause a danger for the driver of the vehicle. Besides, the apparatus has extremely reduced overall dimensions, thereby confering a greater to the handlebar compactness and a more attractive appearance.

The construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

What is claimed is:

1. An apparatus for controlling a hydraulic circuit to be used for operating hydraulic clutches, said apparatus comprising:
   a pump connected with a relevant reservoir for the fluid of the hydraulic circuit and including a piston sliding within a relevant chamber provided with one or more ports for connection to said reservoir, said piston being so shaped as to close/open said ports upon its stroke along said chamber, wherein the idle stroke of said piston within said chamber is adjustable through a rotation of said piston about its longitudinal axis, wherein said pump is interconnected to a clutch disk-operating piston via the hydraulic circuit.

2. The apparatus of claim 1, wherein said piston is provided with a gasket able to close said ports upon said piston's stroke along said chamber and wherein said gasket has a circumferential development with different height so as to provide, in correspondence of a rotation of said piston about its longitudinal axis, a different front of interaction with said ports.

3. The apparatus of claim 1, wherein said piston is provided with a maneuverable knob allowing said piston to be rotated with respect to said chamber.

4. The apparatus of claim 2, wherein said piston is provided with a maneuverable knob allowing said piston to be rotated with respect to said chamber.

5. The apparatus of claim 1 wherein said piston is connected to a pump-controlling lever via a connecting rod having a spherical head.

6. The apparatus of claim 2 wherein said piston is connected to a pump-controlling lever via a connecting rod having a spherical head.

7. The apparatus of claim 1 wherein said reservoir is disposed fully inside a storing body.

8. The apparatus of claim 2 wherein said reservoir is disposed fully inside a storing body.

9. The apparatus of claim 1, wherein said reservoir is disposed fully inside a storing body and exhibits a concave portion shaped complementarily with a portion of a handlebar.

10. The apparatus of claim 2, wherein said reservoir is disposed fully inside a storing body and exhibits a concave portion shaped complementarily with a portion of a handlebar.

11. The apparatus of claim 9, wherein said concave portion consists of a lid of said reservoir.

12. The apparatus of claim 10, wherein said concave portion consists of a lid of said reservoir.

13. The apparatus of claim 7, further comprising:
   a semicollar having a concavity of a shape suitable for complementarily fitting the handlebar on the side opposite to said body.

14. The apparatus of claim 8, further comprising:
   a semicollar having a concavity of a shape suitable for complementarily fitting the handlebar on the side opposite to said body.

15. A hydraulic clutch operating system comprising:
   a pump defined by a body, wherein said pump is interconnected via a hydraulic circuit to a clutch disk;
   a chamber carved lengthwise along an axis within said body;
   a reservoir provided adjacent said chamber;
   a port connecting said chamber with said reservoir for providing the fluid of the hydraulic circuit; and
   a piston designed to slide within said chamber along said axis, said piston shaped to open/close said port upon sliding within said chamber, wherein an idle stroke of said piston is adjusted through a rotation of said piston about said axis.

16. A system according to claim 15, further comprising:
   a gasket shaped to close said port upon said piston's stroke along said axis, wherein said gasket has an inclined circumferential end portion with different height designed to provide a different interactive front with said port in correspondence with a rotation of said piston.

17. A system according to claim 16, wherein said piston is provided with a maneuverable knob allowing said piston to be rotated with respect to said chamber.

18. A system according to claim 15, wherein said reservoir is disposed fully inside a storing body and exhibits a concave portion shaped complementarily with a portion of a handlebar.

19. A system according to claim 18, wherein said concave portion consists of a lid of said reservoir.

20. A system according to claim 15, further comprising:
   a semicollar having a concavity of a shape suitable for complementarily fitting a handlebar on the side opposite to said body.

* * * * *